No. 765,144. PATENTED JULY 12, 1904.
F. LAMBERT.
WATER METER.
APPLICATION FILED JAN. 27, 1904.
NO MODEL. 2 SHEETS—SHEET 1.

Witnesses
Frank Lambert Inventor
By his Attorney
Edith J. Griswold

No. 765,144. PATENTED JULY 12, 1904.
F. LAMBERT.
WATER METER.
APPLICATION FILED JAN. 27, 1904.
NO MODEL. 3 SHEETS—SHEET 2.

Witnesses
Geo H Botts
Mabelle F. Lake

Inventor
Frank Lambert
By his Attorney
Edith J. Griswold

No. 765,144. Patented July 12, 1904.

UNITED STATES PATENT OFFICE.

FRANK LAMBERT, OF NEW YORK, N. Y.

WATER-METER.

SPECIFICATION forming part of Letters Patent No. 765,144, dated July 12, 1904.

Original application filed May 10, 1902, Serial No. 106,730. Divided and this application filed January 27, 1904. Serial No. 190,784. (No model.)

*To all whom it may concern:*

Be it known that I, FRANK LAMBERT, a citizen of the United States, and a resident of New York city, borough of Brooklyn, Kings county, State of New York, have invented Improvements in Water-Meters, of which the following is a specification.

This invention relates to water-meters, and more particularly to the manner of assembling various internal parts of the meter together.

This application originally formed part of application Serial No. 106,730, filed May 10, 1902, which application was divided, the present case being separated from the original.

My present improvements are to prevent buckling, bending, or straining of the gear-train, gear-plates, or controlling device when the water in the meter freezes or obstructions wedge or lodge between the disk-chamber and the disk-piston; and it consists in mounting the various parts so that they may free themselves by moving out of normal position.

In the accompanying drawings I have shown one form of water-meter to illustrate the principles of my invention; but it is to be understood that I do not limit myself to this form nor to any particular construction for carrying my invention into effect.

Figure 1:
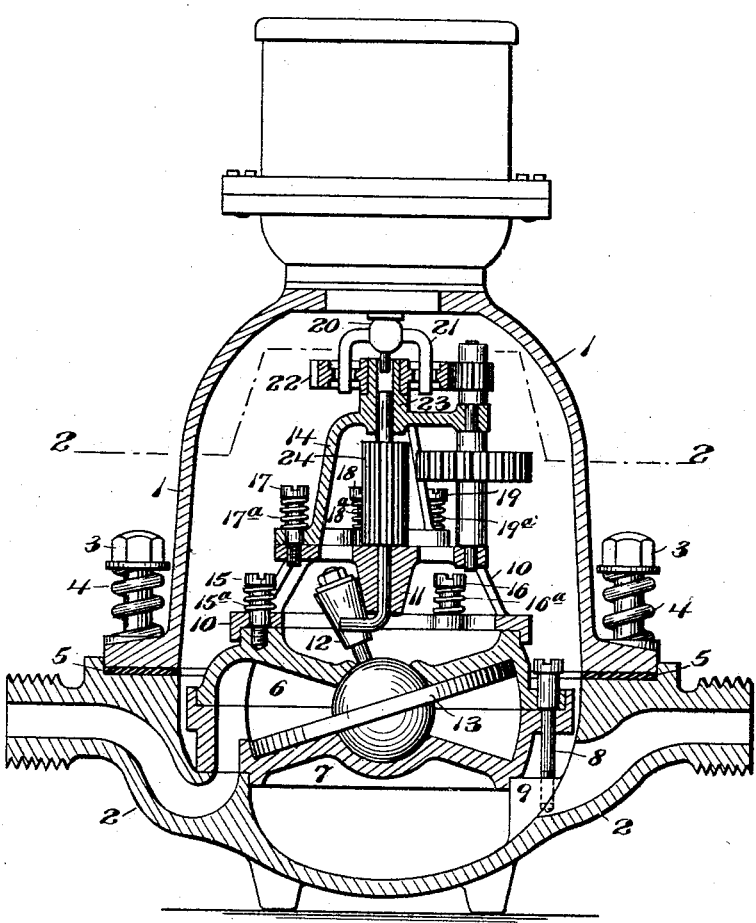
Figure 2:
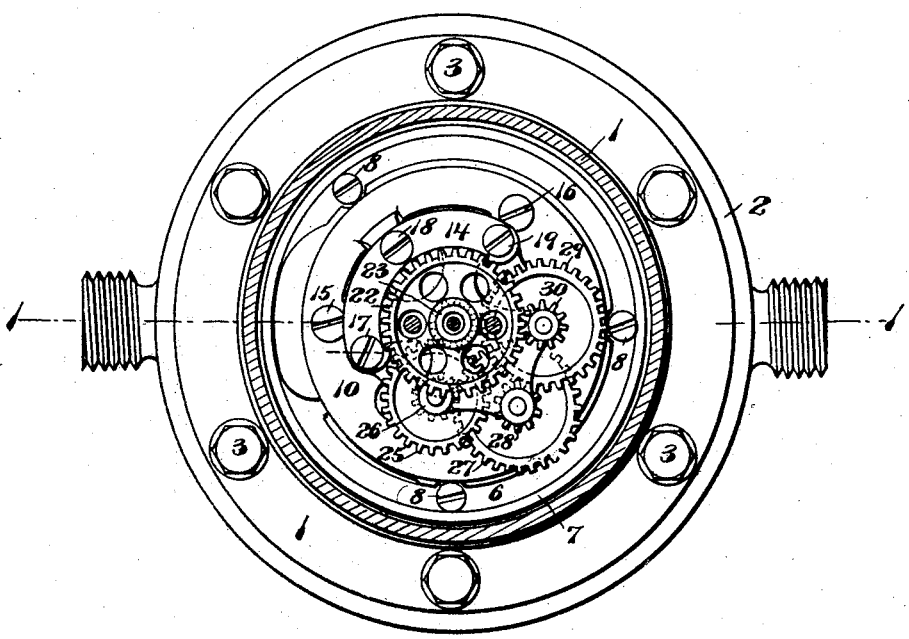

Figure 1 is a sectional elevation of a meter embodying my improvements, taken on line 1 1 of Fig. 2, the top of the meter being shown in full. Fig. 2 is a sectional plan taken on line 2 2 of Fig. 1.

The figures represent a common form of disk meter having the casing made in sections 1 and 2. I preferably secure these sections together by resilient means, which may consist of bolts 3, passing through the flange of section 1 and threaded into the flange of section 2, the bolts being long enough above the threaded part to permit the sections 1 and 2 moving apart, and springs 4 interposed between the bolt-heads and the upper face of the flange of section 1. These springs are calculated to exert sufficient tension to hold the sections together and compress the packing 5 between them to make a water-tight joint under normal water-service pressure, but to yield under a pressure less than would be necessary to deform the meter.

The lower section 7 of the measuring-chamber 6 7 is fitted to the lower section 2 of the casing and is held fast in position by the shouldered screws 8, passing through the flanges of the sections of the measuring-chamber and threading into lugs 9 in the lower section 2 of the casing. With this construction when under supernormal pressure the sections of the casing are moved apart section 7 of the measuring-chamber will move or remain with the lower section 2 of the casing, even should the other internal parts of the meter be moved away from this section 7. Section 6 of the measuring-chamber is seated in section 7 by gravity and water-pressure and is free to move independently of section 7, the upper part of screws 8 acting to prevent independent rotation or the sections getting wholly apart.

As so far described, the seating of the measuring-chamber by gravity and the independent motion of the chamber-sections from each other are shown in reference to another form of meter and claimed in my said application Serial No. 106,730, of which this application is a division. In the meter herein shown the frame 10 carries the hub or controlling device 11, against which the roller 12 of the disk-piston 13 is made to bear to control the motion of the disk; but any other kind of controlling device for the disk may be used, my invention consisting in so mounting a controlling device in any manner that will leave it free to move away from the disk and prevent distortion or breakage in case the disk-piston is forced from normal position. Also in the construction shown the frame 10 constitutes the lower gear-plate, and the upper gear-plate 14 is in the form of a bracket. However, my invention is not limited to this construction, but consists in so mounting the gear-plates in any manner that will permit them to move apart and also permit of the relative position of the gears and plates being variable. The arrangement for accomplishing these objects, as herein shown, consists in mounting the frame or lower gear-plate 10 upon the measuring-chamber by resilient or reacting means, such as shouldered screws 15 and 16 and springs 15ª 16ª, and in mounting the upper gear-plate 14 upon the frame 10 by resilient or reacting means—such as shouldered screws 17, 18, and 19 and springs 17ª, 18ª, and 19ª. This permits the parts to move up and down in relation to each other by compressing the springs. However, any other arrangement for enabling these several parts to be separated under abnormal conditions may be used without departing from my invention.

Preferably the spindle 20, passing down from the register and carrying the fork 21 to engage with the gear-wheel 22, is prolonged to enter freely the open end of the hub 23, formed on the upper gear-plate 14 to carry the wheel 22 to prevent too much tilting of the parts, especially when the meter is handled or shipped.

The gear connections may be traced from the pinion 24 on the spindle actuated by the roller 12 to gear-wheel 22, as follows: Pinion 24 actuates wheel 25, Fig. 2, and pinion 26, fast on the spindle of wheel 25, actuates the gear-wheel 27; pinion 28, fast with wheel 27, actuates the gear-wheel 29, and pinion 30, fast with the wheel 29, actuates the gear-wheel 22.

I do not limit myself to any particular means shown for carrying out my invention nor to any combination of the various features described.

I claim as my invention—

1. In a water-meter, the combination of a casing, means for closing said casing, said means capable of yielding under an internal pressure less than that necessary to deform the meter, with a measuring device, and a train of gears normally held in position in said casing, but free to be forced out of normal position under abnormal working of the meter.

2. In a water-meter, the combination of a casing and a measuring-chamber mounted therein, with a gear-train and resilient means for holding said train on said chamber.

3. In a water-meter, a casing, mounted therein a measuring-chamber, a controlling-hub and a gear-train, the said internal parts being capable of independent motion from each other during abnormal working of the meter.

4. In a water-meter, an external casing, held therein a measuring-chamber, a disk in said chamber, a controlling-hub for said disk, a gear-train, and resilient means for mounting the said internal parts together.

5. In a water-meter, a measuring device, a reducing gear-train therefor, gear-plates between which the gears are mounted, and resilient means for holding said plates whereby they are free to move apart under abnormal working condition.

6. In a water-meter, a measuring device, a reducing gear-train therefor, and gear-plates between which the gears are mounted, and resilient means for holding said gear-plates together.

7. In a water-meter, a measuring device, a reducing gear-train therefor, gear-plates between which the gears are mounted, and means for holding the parts so that the relative positions of said gears and plates are variable under abnormal working conditions.

8. In a disk water-meter, a measuring-chamber, a disk therein, a controlling device for said disk, and means for holding the said chamber and the said device whereby they are capable of being moved independently out of normal position under abnormal working conditions.

9. In a water-meter, a measuring-chamber, a disk therein, a controlling device for said disk, and means for holding the said device so that it is free to move away from said disk, under abnormal working conditions.

In testimony whereof I have signed my name to this specification in the presence of two subscribing witnesses.

FRANK LAMBERT.

Witnesses:
  EDITH J. GRISWOLD,
  MABELLE F. LAKE.